United States Patent [19]

Ono et al.

[11] Patent Number: 4,557,598

[45] Date of Patent: Dec. 10, 1985

[54] APPARATUS FOR CHECKING THE INTERNAL SURFACE OF A PIPE OR THE LIKE

[75] Inventors: Kimizo Ono; Koichi Tsuno, both of Osaka, Japan

[73] Assignee: Sumitomo Electric Industries, Ltd., Osaka, Japan

[21] Appl. No.: 448,341

[22] Filed: Dec. 9, 1982

[30] Foreign Application Priority Data

Jan. 7, 1982 [JP] Japan .................... 57-1040[U]

[51] Int. Cl.$^4$ .................... G01N 21/88; G02B 23/02
[52] U.S. Cl. .................................................. 356/241
[58] Field of Search ................. 356/241, 444, 445

[56] References Cited

U.S. PATENT DOCUMENTS 2,899,856  8/1959  Shull .................................. 356/241
3,761,186  9/1973  Wason ............................... 356/241
4,277,168  7/1981  Oku .................................... 356/241
4,440,496  4/1984  Milana ............................... 356/241

FOREIGN PATENT DOCUMENTS 0021719  2/1977  Japan ................................. 356/241
0082952  6/1980  Japan ................................. 356/241

Primary Examiner—Davis L. Willis
Assistant Examiner—S. A. Turner
Attorney, Agent, or Firm—Ernest A. Beutler

[57] ABSTRACT

An improved apparatus for checking the inside of a pipe or the like is proposed. Two reflex mirrors are provided, one for reflecting the light from a source of light and the other for reflecting the light from the object being checked. Because respective mirrors are provided for the source of light and for the light from the object, the inside of the object can be checked clearly.

7 Claims, 2 Drawing Figures

APPARATUS FOR CHECKING THE INTERNAL SURFACE OF A PIPE OR THE LIKE

The present invention relates to an apparatus for watching, observing or checking the internal surface of a water pipe, gas pipe, pit or hole sunk into the earth by boring, etc.

FIG. 1 shows a conventional apparatus for checking for any abnormality on the internal surface of a pipe, pit or hole. This apparatus includes a cylindrical, transparent casing 1 provided with a top wall 2 to which a motor 3 is secured to rotate a reflex mirror 4 attached to the lower end of the motor shaft within the casing 1. An opening provided at the lower end of the casing 1 is plugged by a base stopper 5 in which a holder 8 carrying a light guide cable 6 and an image pickup fiber 7 is inserted.

In this apparatus, the reflex mirror 4 is used for dual purposes. On one hand, the light a which has just passed through the light guide cable 6 is reflected by the reflex mirror 4 onto the object to be watched. On the other hand, the light b reflected by the object to be watched is again reflected by the reflex mirror 4 so as to be picked up by the image pickup fiber 7. A trouble is that partial reflection sometimes takes place when the light a outwardly passes through the casing 1, so that the light a' reflected by the surface of the casing enters the image pickup fiber 7 together with the light b. Another trouble is that diffused reflection sometimes takes place owing to some mar or stain on the surface of the mirror when the light a is incident upon the reflex mirror 4, so that part of the diffused light a" resulting from such diffused reflection enters the image pickup fiber 7 together with the light b. In the event of such reflection, part of the object to be watched becomes hardly visible.

It is an object of the present invention to provide an apparatus for watching the internal surface of a pipe or the like, which obviates the above-described disadvantage. In connection with the present invention, another reflex mirror for the light reflected from an object to be watched is provided separately from a reflex mirror for the light from the light guide cable.

With this object in view, the present invention will become apparent from the following detailed description, which will be more clearly understood in connection with the accompanying drawings.

Figure 1:
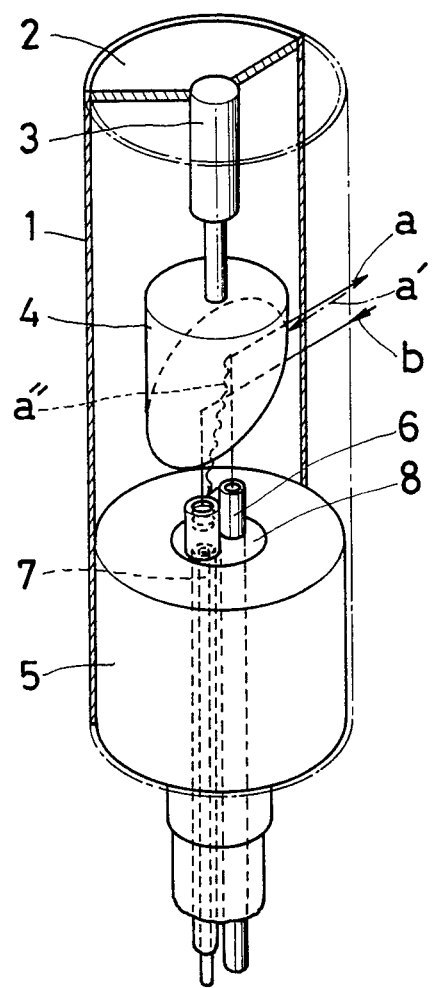
FIG. 1 is a vertical sectional view of a conventional apparatus.
Figure 2:
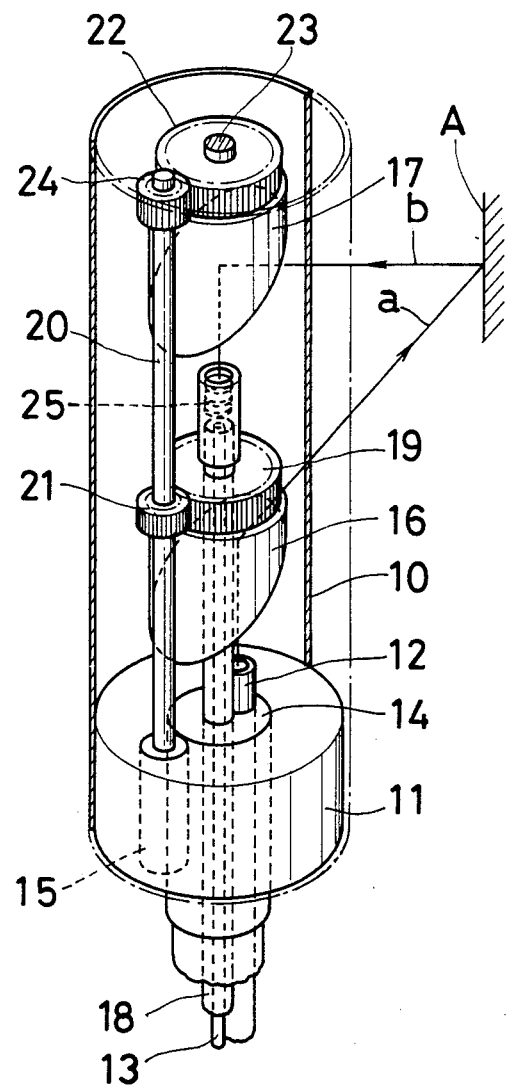
FIG. 2 is a vertical sectional view of an apparatus according to the present invention.

Referring now to FIG. 2, an apparatus in accordance with the present invention includes a cylindrical, transparent casing 10. An opening at the lower end of the casing 10 is plugged by a base stopper 11, in which a holder 14 carrying a light guide cable 12 and an image pickup fiber 13 is inserted. A motor 15 is embedded in the base stopper 11. A reflex mirror 16 for the light a from the light guide cable 12 is provided in the middle of the interior of the casing 10, while another reflex mirror 17 for the light b reflected from the object A to be watched is provided in the upper part of the casing 10.

The image pickup fiber 13 is accommodated in a pipe 18 which extends through the reflex mirror 16 with its axis aligned with the axis of rotation of the reflex mirror 16. The light guide cable 12 projects from the top surface of the holder 14 at an eccentric point and points to the inclined specular surface of the reflex mirror 16. The reflex mirror 16, to the top of which a gear 19 is secured, is rotatably supported on the pipe 18. The shaft 20 of the motor 15 extends upwardly to the top of the casing 10 and the upper end thereof is rotatably supported by the top wall of the casing 10. A pinion 21 secured to the middle portion of the motor shaft 20 meshes with the gear 19. The image pickup fiber 13, together with the pipe 18, projects from the upper surface of the gear 19 and points to the inclined specular surface of the reflex mirror 17. A lens assembly 25 is mounted on the upper end of the pipe 18.

The reflex mirror 17, to the upper surface of which a gear 22 is secured, is attached to the lower end of a shaft 23 which is rotatably mounted on the top wall of the casing 10. A pinion 24 secured to the upper portion of the motor shaft 20 meshes with the gear 22. The numbers of teeth of the pinions 21, 24 and of the gears 19, 22 are decided so that the direction to which the specular surface of the reflex mirror 16 faces may always be kept in a certain relation to the direction to which the specular surface of the reflex mirror 17 faces.

In operation, the apparatus in accordance with the present invention is inserted into a pipe or the like, the internal surface of which is to be watched. Then the reflex mirrors 16 and 17 are rotated by starting the motor 15. The light a from the light guide cable 12 is reflected by the specular surface of the reflex mirror 16 and is allowed to irradiate the object A to be watched. The light b reflected from the object A is incident upon the specular surface of the reflex mirror 17, reflected thereby, and allowed to pass through the lens assembly 25 and then through the image pickup fiber 13.

Because two reflex mirrors are provided separately, the above-mentioned disadvantage is eliminated. The light reflected by the casing or the light diffused on the surface of the mirror does not enter the image pickup fiber any more because another mirror is provided and because the point of light pickup and the point of light irradiation are at different levels. These advantages render the object A clearly visible.

While a preferred embodiment of the present invention has been disclosed, it is to be understood that it has been described by way of example only, various other modifications being obvious.

What are claimed are:

1. An apparatus for checking the internal surface of a pipe or the like comprising a cylindrical casing having a circumferentially continuous light transmitting area, a light source fixed within said casing and emitting in a generally axial direction, a first reflex mirror rotatably mounted within said casing about an axis parallel to said casing to reflect the light from said source of light generally radially through said light transmitting area toward the object to be checked, a second reflex mirror rotatably mounted within said casing about an axis parallel to said casing and positioned to reflect the light from the object generally axially in said casing in a direction opposite to the direction of light emination from said light source, and sensing means fixed within said casing for picking up the light reflected by said second reflex mirror.

2. The apparatus as claimed in claim 1, wherein said first and second reflex mirrors are rotatably driven by a common drive means so as to keep a fixed relative position between said first reflex mirror and said second reflex mirror.

3. The apparatus as claimed in claim 1, wherein said sensing means is contained in a pipe fixed relative to said casing and which extends through said first reflex mirror with its axis aligned with the axis of rotation of said first reflex mirror.

4. The apparatus as claimed in claim 2 wherein the first and second reflex mirrors are axially spaced from each other.

5. The apparatus as claimed in claim 4 wherein said sensing means is contained in a pipe which extends through said first reflex mirror with its axis aligned with the axis of rotation of said first reflex mirror.

6. The apparatus as claimed in claim 2, further comprising a gear fixed relative to said first reflex mirror, a gear fixed relative to said second reflex mirror, a shaft axially extending in said casing, and two pinions fixedly mounted on said shaft and engaging said gears, said driving means comprising a motor coupled to said shaft to rotate it.

7. The apparatus as claimed in claim 4, wherein the light source and the pickup means are positioned on the same side of the second reflex mirror.

* * * * *